United States Patent [19]
Kirby

[11] Patent Number: 5,073,108
[45] Date of Patent: Dec. 17, 1991

[54] APPARATUS FOR HEATING PIPE

[76] Inventor: Alan Kirby, 3880 - 74 Avenue, Edmonton, Alberta, Canada, T6B 2P7

[21] Appl. No.: 447,231

[22] Filed: Dec. 7, 1989

[51] Int. Cl.⁵ .............................. F24J 3/00; E03B 7/14
[52] U.S. Cl. ...................................... 432/225; 138/32; 138/35
[58] Field of Search .................... 432/10, 11, 63, 225, 432/226; 138/35, 32, 97, 99

[56] References Cited

U.S. PATENT DOCUMENTS

| | | | |
|---|---|---|---|
| 2,490,252 | 12/1949 | Brewer | 432/225 X |
| 3,933,519 | 1/1976 | Koch et al. | 138/97 X |
| 4,039,279 | 8/1977 | Horeczko | 432/225 |
| 4,515,562 | 5/1985 | Williams | 432/225 |
| 4,722,684 | 2/1988 | Kvivik | 432/225 |
| 4,749,843 | 6/1988 | Abramson | 432/225 X |

FOREIGN PATENT DOCUMENTS 983335 2/1976 Canada .

Primary Examiner—Henry A. Bennett
Assistant Examiner—Christopher B. Kilner
Attorney, Agent, or Firm—George Haining Dunsmuir

[57] ABSTRACT

An apparatus for heating a length of pipe and/or sleeve mounted thereon includes a main frame defined by a pair of posts for mounting on the pipe on each side of the area to be heated and a guide bar extending between the top ends of the posts parallel to the pipe; a screw extending between the posts above the pipe in the use position; a carriage mounted on the screw for movement longitudinally of the pipe when the screw is rotated; a bifurcated heater carrier frame, the arms of which are pivotally connected to the carriage for rotation between an open position and a closed position in which the heaters surround the pipe and any sleeve mounted thereon, whereby, with the heaters in operation, the carriage and consequently the heaters can be moved along the pipe to heat the latter uniformly.

9 Claims, 4 Drawing Sheets

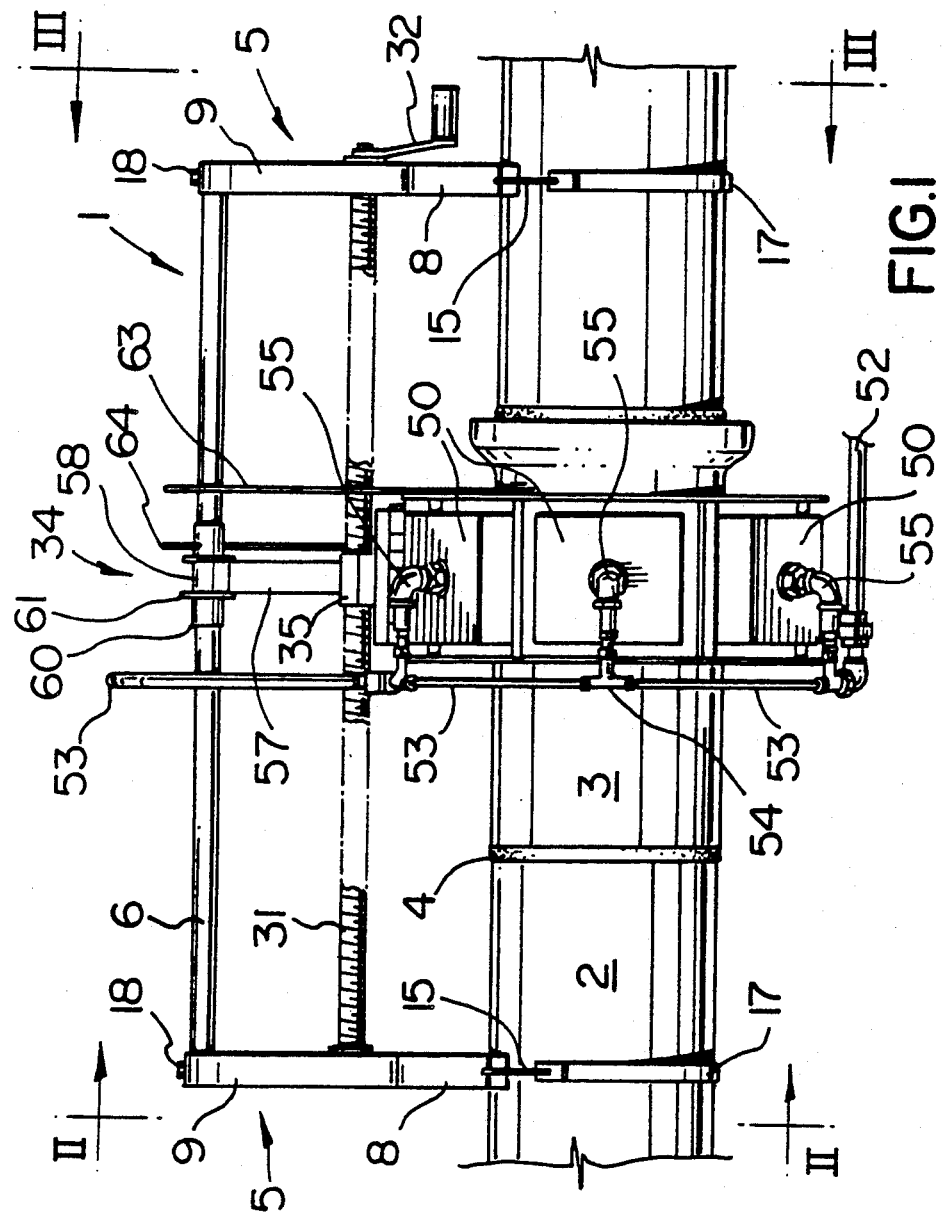

APPARATUS FOR HEATING PIPE

BACKGROUND OF THE INVENTION

This invention relates to an apparatus for heating a pipe and/or a sleeve on a pipe or pipe joint.

It is common practice to apply a sleeve to a coated pipeline joint. The usual method involves the cleaning of rust scale and dirt from the joint, the preheating of the joint, the application of adhesive and a heat shrinkable sleeve to the joint without creating air bubbles between the pipe and the sleeve, and the bonding of the adhesive to both the pipe and the sleeve with good adhesion. In the past, a propane torch or an electrical induction heating has been used to effect preheating and sleeve application. Both methods have major drawbacks - the propane torch may overheat or underheat the pipe during the preheat stage and may burn or underheat the shrink sleeve during the application stage. Thus, successful application of a sleeve using a torch is dependent upon the skill and care exercised by the persons installing the sleeve. Electrical induction heating requires expensive equipment and skilled operators.

A search of the patent literature fails to disclose a solution to the above defined problems. Canadian Patent No. 983,335, issued to F. W. Mayo et al on Feb. 10, 1976, and U.S. Pats. Nos. 2,296,387, issued to H. V. Inskeep et al on Sept. 22, 1942; 3,074,704, issued to B. Ronay on Jan. 22, 1963 and 3,202,406, issued to W. L. Tack on Aug. 24, 1965 disclose heaters having some features in common with the invention described herein. However, none of the patented devices could be used to effect uniform heating of the type proposed in the present case.

The object of this invention is to provide a solution to the problem of pipe and sleeve or cover heating in the form of a relatively simple apparatus for heating an elongated cylindrical object, and more specifically, a pipe or a cover for the pipe.

BRIEF SUMMARY OF THE INVENTION

Accordingly, the invention relates to an apparatus for heating a pipe or other elongated cylindrical object comprising track means for mounting in spaced apart, parallel relationship to the pipe; carriage means slidably mounted on said track means for movement therealong; drive means for moving said carriage means along said trace means parallel to the pipe; and annular heater means carried by said carriage means for surrounding said pipe and for movement with said carriage means along said track means, whereby the pipe can be heated along a substantial length thereof.

BRIEF DESCRIPTION OF THE DRAWINGS

The invention will be described in greater detail with reference to the accompanying drawings, which illustrate preferred embodiments of the invention, and wherein:

FIG. 1 is a side elevation view of a section of pipe and sleeve with an apparatus in accordance with the present invention mounted thereon;

DESCRIPTION OF THE PREFERRED EMBODIMENT(S)

Figure 3:
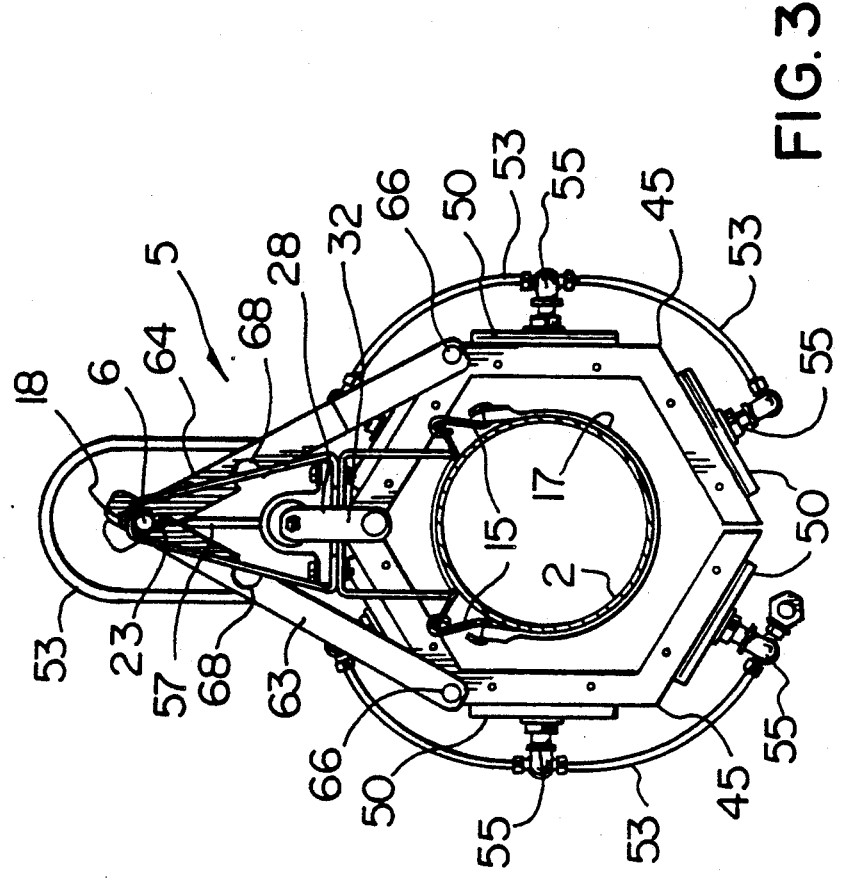
FIGS. 2 and 3 are cross sections taken generally along lines II—II and III—III, respectively of FIG. 1.
Figure 2:
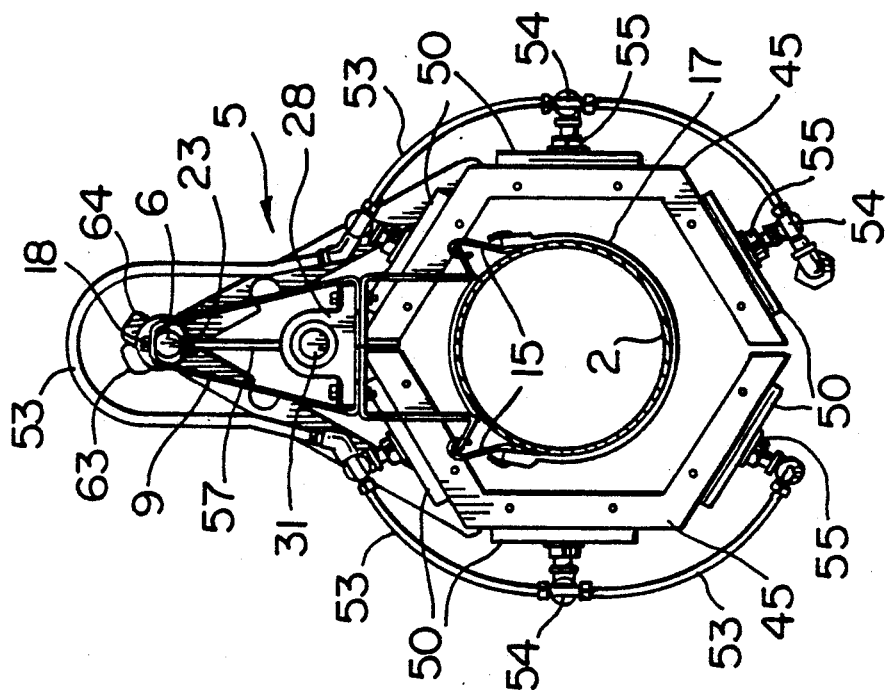
Figure 4:
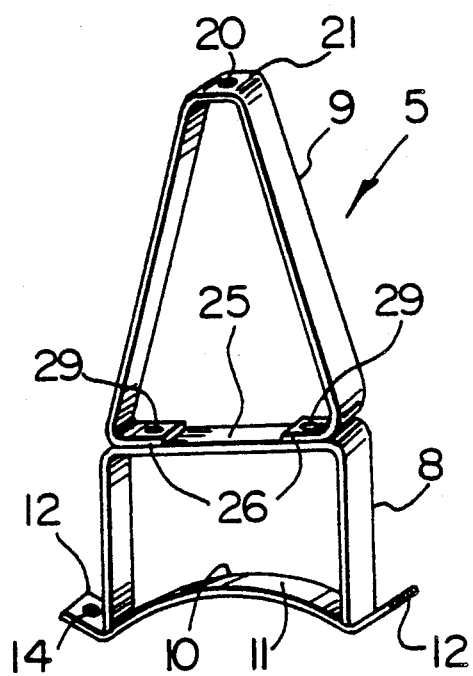
FIG. 4 is an isometric view of one end of a main frame used in the apparatus of FIGS. 1 to 3.

Referring to FIGS. 1 to 3, the apparatus of the present invention includes a main frame generally indicated at 1 for mounting on a pipe 2 straddling a sleeve 3 to be shrunk onto an adhesive coating 4 on the pipe 2. The frame 1 is defined by a pair of skeletal posts generally indicated at 5 interconnected by a tubular guide bar 6. Each post 5 (FIG. 4) is defined by strips of metal forming a generally rectangular lower portion 8 and a generally triangular upper portion 9. The base 10 of the lower portion includes a concavo-convex center 11 for seating on the pipe 1, and a pair of upwardly inclined wings 12 at the ends thereof with holes 14 (one shown—FIG. 4) for receiving hooks 15 (FIGS. 1 to 3) which connect the post 5 to a retaining strap 17. A bolt 18 extends through an opening 20 (FIG. 4) in the top 21 of the upper portion 9 of each post 5 and through one end of the guide bar 6 and a nut 23 for holding the bar 6 in the post 5.

The top 25 of the lower portion 8 and the bottom ends 26 of the upper portion 9 of each post 5 carry a pillow block bearing 28 (FIGS. 2 and 3). For such purpose, aligned holes 29 are provided in the ends 26 of the upper portion 9 and in the top 25 of the lower portion 8 of the post 5. A drive screw 31 extends between and is rotatably mounted in the bearings 28. The screw 31 is rotated by a handle 32 mounted on one end thereof. Of course, the handle 32 can be replaced by a reversible, variable speed motor (not shown).

Figure 5:
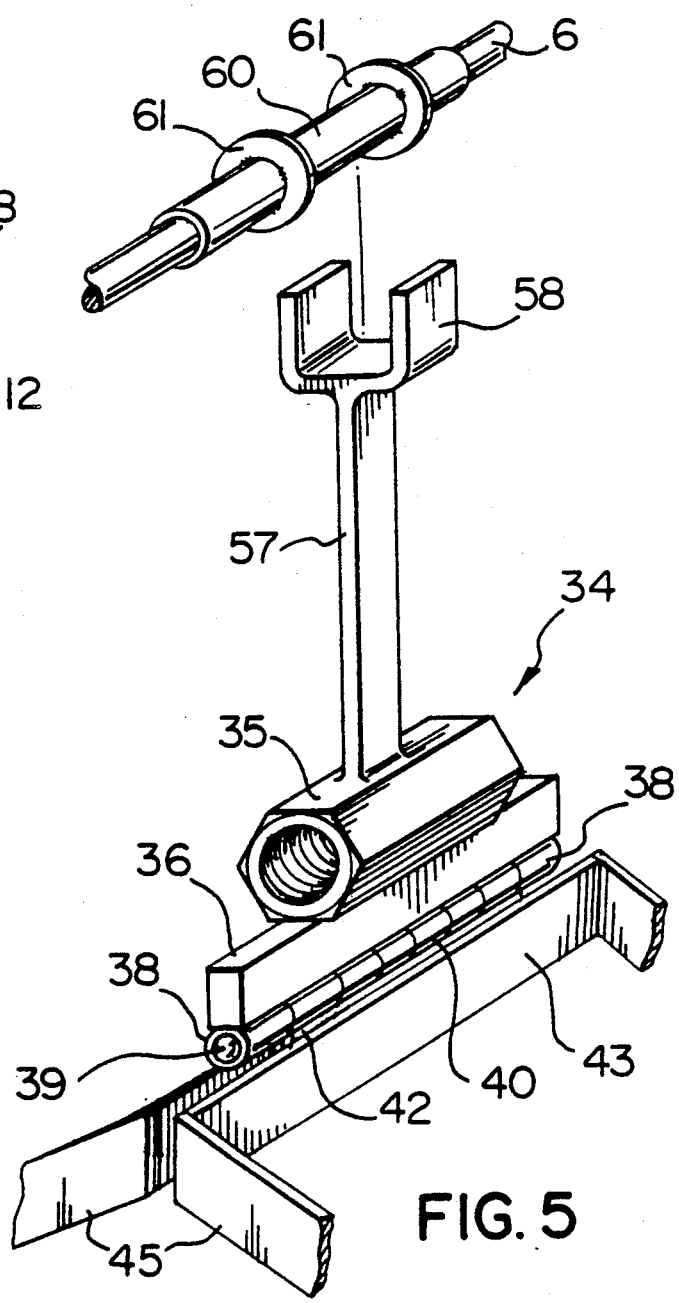
FIG. 5 is an exploded, isometric view of a portion of a heater frame and carriage used in the apparatus of FIGS. 1 to 3.
Figure 6:
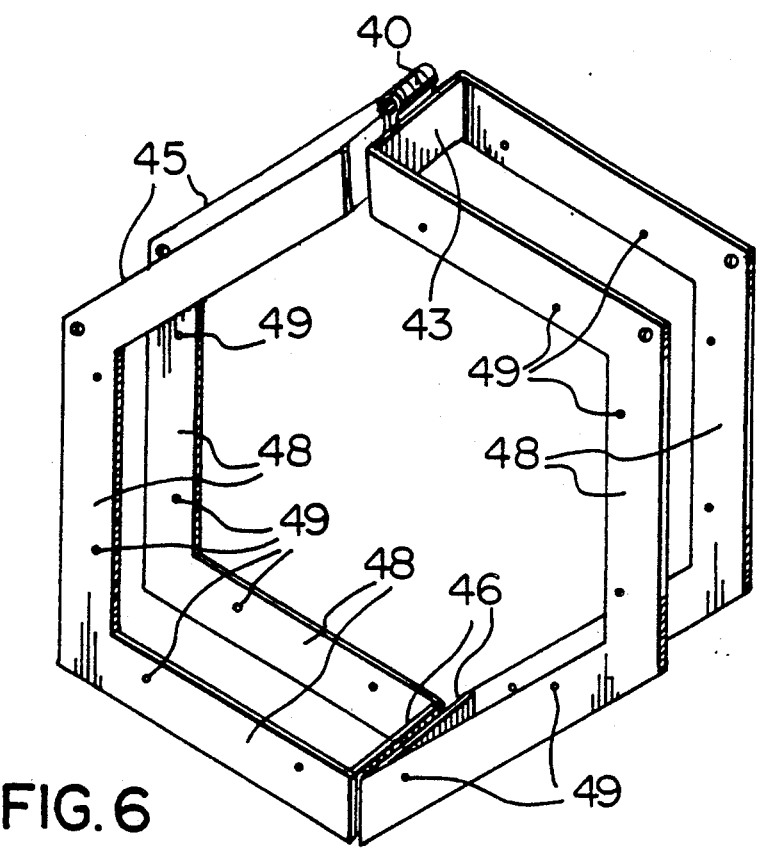
FIG. 6 is a perspective view of the entire heater frame of FIG. 5.

With reference to FIGS. 5 and 6, the screw 31 carries a carriage generally indicated at 34. The carriage 34 includes an internally threaded, hexagonal sleeve 35 with a bar 36 suspended from the bottom thereof. The bar 36 carries a pair of short sleeves 38, which combine with a pin 39 to support a hinge 40. The hinge 40 includes a pair of plates 42 extending downwardly between longitudinally extending top bars 43 of the sides 45 of a bifurcated heater frame. Each side 45 includes the top bars 43, bottom bars 46 and generally C-shaped end plates 48. When the frame sides 45 are in the closed position (FIGS. 2, 3 and 6), the end plates 48 define hexagons around the pipe 2. Holes 49 are provided in the plates 48 for receiving bolts (not shown), which connect rectangular heaters 50 to the frame 45.

The heaters 50 are preferably catalitic heaters of the type available from Cis-Can Sales Western Ltd. (Cata-Dyne)—trade name) but may also be infrared heaters of the type available from C.H.C. Incorporated [Model B-6-6 (FX) N]. Other suitable heaters are available from Farris Industries Canada (Model 6X6) and Teledyne Merla (Model 855-013A-AA0-00). Fuel is fed to the heaters via an inlet pipe 52, tubing 53, T-joints 54 and inlet couplings 55.

Rotation of the frame sides 45 on the screw 31 is prevented by a post 57 integral with and extending upwardly from the sleeve 35. A U-shaped top end or yoke 58 on the post 57 embraces a sleeve 60, which is slidably mounted on the guide bar 6. A pair of rings 61 are provided on the sleeve 60 for ensuring that the latter moves with the carriage 34.

Figure 8:
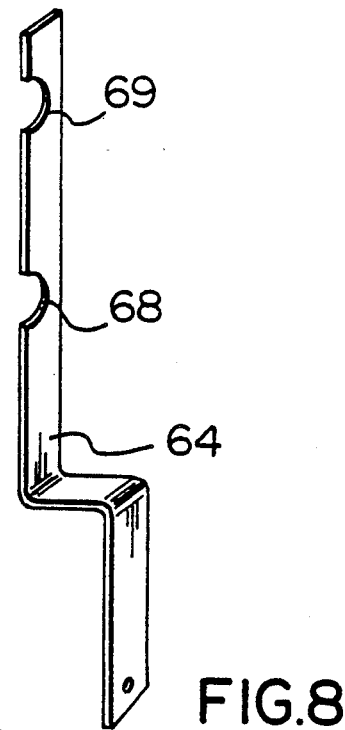
FIG. 8 is an isometric view of one of the heater frame operating arms of FIG. 7.
Figure 7:
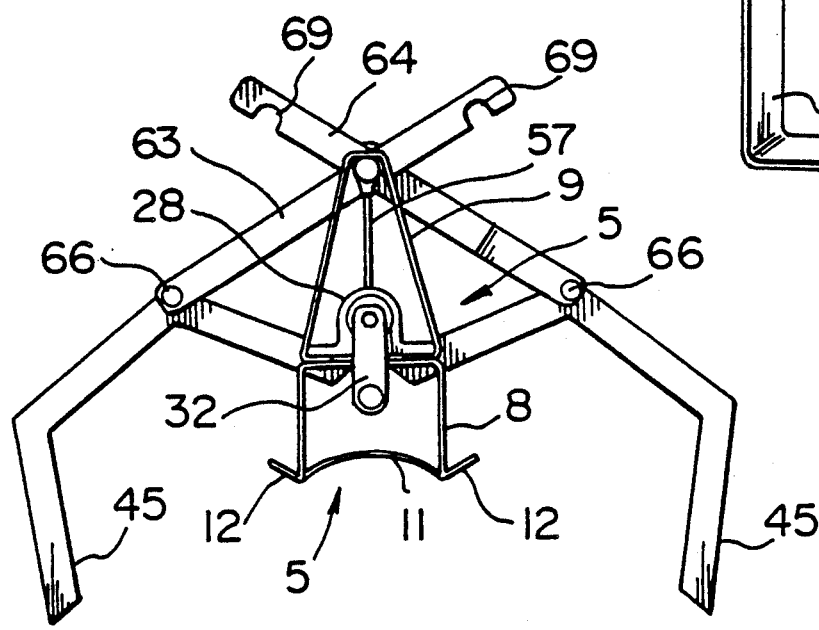
FIG. 7 is a schematic end elevational view of the main frame, heater frame, and frame operating arms used in the apparatus of FIGS. 1 to 3.

The heater frame sides 45 are rotated between open (FIG. 7) and closed (FIGS. 1 to 3 and 6) positions by means of a pair of arms 63 and 64 (FIG. 8). The bottom ends of the arms 63 and 64 are pivotally connected to the sides 45 by pins 66, so that vertical movement of the arms 63 and 64 is accompanied by rotation of the sides 45 around the longitudinal axes of the pin 39 (FIG. 5). Each arm 63 and 64 contains a pair of semicircular grooves 68 and 69. When the sides 45 are in the open position (FIG. 7), the grooves 68 rest on the guidebar 6. When the heater is in the closed position (FIGS. 1 to 3) the groove 69 on the bar 63 rests on the guide bar 6, and the groove 69 on the stepped bar 64 rests on the sleeve 60 (FIG. 1). The bars 63 and 64 serve to releasably retain the heater frame sides 45 in the open or closed position.

In a shrink wrapping operation, the main frame 1 carrying the heater frame 45 and the heaters 50 in the open position is mounted on the pipe. The sides 45 of the heater frame are moved to the closed position so that the heaters 50 define in this particular configuration a hexagonal sleeve. The handle 32 and consequently the screw 31 are rotated to move the heaters 50 back and forth over the pipe 2 to preheat the latter. The sleeve 3 is moved into position on the preheated pipe 2 by sliding the sleeve into position or by wrapping the sleeve around the pipe, depending on which type of sleeve is being applied. The heaters 50 are then moved at a constant speed along the sleeve 3 from either end thereof. The sleeve 3 will start to shrink as it enters the heater frame, and should be completely shrunk by the center of the heating area.

The speed of travel of the heaters 50 can be adjusted to suit the particular sleeve 3 and other parameters. Experience has proven that shrink sleeves can be applied to 2 to 8" pipe at a rate of six inches per minute. Following application, the sleeve manufacturer's recommendations are used to remove air bubbles or to press the sleeve around welds or overlaps.

What is claimed is:

1. An apparatus for heating a pipe and heat shrinking a shrinkable plastic sleeve onto the pipe comprising track means for mounting in spaced apart, parallel relationship to the pipe; main frame means for clamp mounting on the pipe for supporting said track means in said spaced apart, parallel relationship to the pipe; carriage means slidably mounted on said track means for movement therealong; drive means for moving said carriage means along said track means parallel to the pipe; and annular heater means carried by said carriage means for surrounding with clearance said pipe and a shrinkable plastic sleeve thereon and for movement with said carriage means along said track means, whereby the pipe can be heated along a substantial length thereof and a plastic sleeve shrunk thereon.

2. An apparatus according to claim 1, including bifurcated heater frame means pivotally carried by said carriage means for supporting said heater means; and manually actuatable control arm means connected to said heater frame means for rotating said heater frame means between open and closed positions.

3. An apparatus according to claim 1, said main frame means supporting said track means, said carriage means, said drive means and said heater means and comprising a plurality of first post means for mounting on the pipe on each side of the area to be heated and shrink wrapped; said track means extending between said first post means; and guide bar means extending between said first post means for guiding said carriage means during movement between said first post means.

4. An apparatus according to claim 3, wherein said track means includes screw means extending between said first post means and through said carriage means, whereby rotation of said screw means by said drive means causes movement of said carriage means along said screw means, and said carriage means includes second post means slidably engaging said guide bar means for ensuring only rectilinear movement of said carriage means.

5. An apparatus according to claim 4, wherein said carriage means includes internally threaded first sleeve means mounted on said screw means, said second post means being connected to and extending upwardly from said first sleeve means into slidable engagement with said guide bar means, said first sleeve means carrying hinge means which pivotally support bifurcated sections of said heater means below said first sleeve means.

6. An apparatus according to claim 5, including second sleeve means slidably mounted on said guide bar means; yoke means on the upper end of said second post means for straddling said second sleeve means; and ring means on said second sleeve means for retaining said yoke means in engagement with said second sleeve means.

7. An apparatus according to claim 3, including bifurcated heater frame means pivotally carried by said carriage means for supporting the heater means, said heater frame means and heater means defining a hexagon around the pipe in the closed position; and manually actuatable control arm means connected to said heater frame means for rotating the latter between open and closed positions.

8. An apparatus according to claim 7, wherein said control arm means includes notch means for engaging said guide bar means in the open and closed position for releasably retaining the control arm means and consequently the heater frame means and heater means in one of the open and closed positions.

9. Apparatus as claimed in claim 4 wherein said screw means is rotatably mounted at its ends in bearings carried by said first post means.

* * * * *